US012534090B2

(12) United States Patent
Thomas et al.

(10) Patent No.: US 12,534,090 B2
(45) Date of Patent: Jan. 27, 2026

(54) SYSTEMS AND METHODS FOR DETECTION OF A LOAD SHIFT AT A VEHICLE

(71) Applicant: Bendix Commercial Vehicle Systems LLC, Avon, OH (US)

(72) Inventors: Thomas J. Thomas, Brunswick, OH (US); Nicholas A. Broyles, North Ridgeville, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 270 days.

(21) Appl. No.: 18/074,043

(22) Filed: Dec. 2, 2022

(65) Prior Publication Data

US 2024/0182042 A1 Jun. 6, 2024

(51) Int. Cl.
*B60W 40/13* (2012.01)

(52) U.S. Cl.
CPC ......... *B60W 40/13* (2013.01); *B60W 2300/14* (2013.01); *B60W 2520/125* (2013.01); *B60W 2520/14* (2013.01); *B60W 2530/10* (2013.01); *B60W 2540/18* (2013.01); *B60W 2552/15* (2020.02); *B60W 2552/30* (2020.02); *B60W 2556/50* (2020.02)

(58) Field of Classification Search
CPC ... B60W 40/072; B60W 40/109; B60W 40/13
See application file for complete search history.

(56) References Cited

U.S. PATENT DOCUMENTS 9,278,693 B2 * 3/2016 Perkins ................. B60T 8/172
9,311,761 B1 * 4/2016 Ye ......................... B60W 40/00
(Continued)

FOREIGN PATENT DOCUMENTS

CN 107310558 11/2017
EP 1 950 539 7/2008
WO WO-2020242361 A1 * 12/2020 ............. B60K 28/08

OTHER PUBLICATIONS

H. D. Kattimani et al., "Vehicular Overload Detection and Protection", International Journal of Latest Research in Engineering and Technology (IJLRET), www.ijlret.com, pp. 119-122.

*Primary Examiner* — Erin D Bishop
*Assistant Examiner* — Alex B Griffin
(74) *Attorney, Agent, or Firm* — Crowell & Moring LLP (57) ABSTRACT

The present disclosure is directed to systems and methods for detecting an overloaded vehicle and/or detecting when a load of a vehicle has shifted. In one form, the present disclosure provides a system comprising a memory and at least one processor. The at least one processor is configured to: receive lateral movement information associated with a first turn and a second turn; determine whether a load of the trailer has shifted based on the lateral movement information associated with the first turn, the lateral movement information associated with the second turn, data characterizing the first turn, and data characterizing the second turn; and upon a determination that the load of the trailer has shifted, at least one of store information associated with the determination that the load of the trailer has shifted or transmit a message with information associated with the determination that the load of the trailer has shifted.

16 Claims, 3 Drawing Sheets

(56) References Cited

U.S. PATENT DOCUMENTS

| | | | |
|---|---|---|---|
| 2004/0036601 A1* | 2/2004 | Obradovich | B60C 23/20 |
| | | | 340/425.5 |
| 2019/0016341 A1 | 1/2019 | Nelson | |
| 2021/0125428 A1* | 4/2021 | Tedesco | G07C 5/0808 |
| 2022/0041158 A1* | 2/2022 | Notohardjono | G06F 30/27 |
| 2022/0242436 A1* | 8/2022 | Wiesenberg | B60W 60/0017 |
| 2023/0146431 A1* | 5/2023 | Gordon | B60W 10/30 |
| | | | 701/41 |
| 2024/0066985 A1* | 2/2024 | Tagawa | B60W 40/10 |
| 2024/0132054 A1* | 4/2024 | Weston | B60W 30/02 |

\* cited by examiner

SYSTEMS AND METHODS FOR DETECTION OF A LOAD SHIFT AT A VEHICLE

BACKGROUND

In commercial shipping, overloading a vehicle past a recommend weight capacity of the vehicle or a failure to detect a shift in a load within the vehicle can shorten a service life of the vehicle, increase operating expenses, and increase the possibility of vehicle accidents. For example, overloading a vehicle or a load shifting within the vehicle increases and/or changes an expected braking distance of the vehicle, increases tire failure rates for the vehicle, and raises and/or shifts a center of gravity of the vehicle, each of which increases the chances for the vehicle to be in an accident and possibly roll over. Advanced systems and methods are desirable to detect when a vehicle is overloaded and/or when a load of the vehicle has shifted.

SUMMARY OF THE DISCLOSURE

The present disclosure describes systems and methods for detecting an overloaded vehicle and systems and methods for detecting when a load of a vehicle has shifted.

In one form, the present disclosure provides a system comprising a memory and at least one processor configured to execute instructions stored in the memory. The at least one processor is further configured to receive lateral movement information associated with a first turn from at least one lateral accelerometer of a trailer of a vehicle; receive lateral movement information associated with a second turn from the at least one lateral accelerometer of the trailer; and determine whether a load of the trailer has shifted based on the lateral movement information associated with the first turn, the lateral movement information associated with the second turn, data characterizing the first turn, and data characterizing the second turn. Upon a determination that the load of the trailer has shifted, the at least one processor is configured to at least one of store information associated with the determination that the load of the trailer has shifted in the memory or transmit a message with information associated with the determination that the load of the trailer has shifted.

In another form, the present disclosure provides a method in which at least one processor receives lateral movement information associated with a first turn from at least one lateral accelerometer of a trailer of a vehicle; receives lateral movement information associated with a second turn from the at least one lateral accelerometer of the trailer; and determines whether a load of the trailer has shifted based on the lateral movement information associated with the first turn, the lateral movement information associated with the second turn, data characterizing the first turn, and data characterizing the second turn. Upon a determination that the load of the trailer has shifted, the at least one processor performs at least one of storing information associated with the determination that the load of the trailer has shifted in a memory or transmitting a message with information associated with the determination that the load of the trailer has shifted.

DETAILED DESCRIPTION OF THE DRAWINGS

The present disclosure describes systems and methods for detecting when a vehicle is overloaded and/or when a load within a vehicle has shifted. As discussed in more detail below, some implementations of a vehicle overload/load shift event detection and reporting system utilize calculated gross mass of a vehicle data, generated by systems a vehicle braking system, to determine a gross mass estimate of the vehicle and compare the determined gross mass estimate to an overweight value. When the vehicle overload/load shift event detection and reporting system determines that the vehicle is overweight based on the comparison, the system may perform operations such notifying a driver of the vehicle of the overweight determination, notifying a fleet management system associated with the vehicle of the overweight determination, and/or modifying one or more vehicle operations based on the vehicle overweight determination.

As also described below, some implementations of a vehicle overload/load shift event detection and reporting system compares lateral movement data generated at a trailer of a vehicle during a right-hand turn and lateral movement data generated at the trailer of the vehicle during a left-hand turn that is similar to the right-hand turn. When a difference in the lateral movement data between the left-hand turn and the right-hand turn indicate that a load in the trailer of the vehicle has shifted, the system may perform operations such notifying a driver of the vehicle of the load shift determination, notifying a fleet management system associated with the vehicle of the load shift determination, and/or modifying one or more vehicle operations based on the load shift determination.

Figure 1:
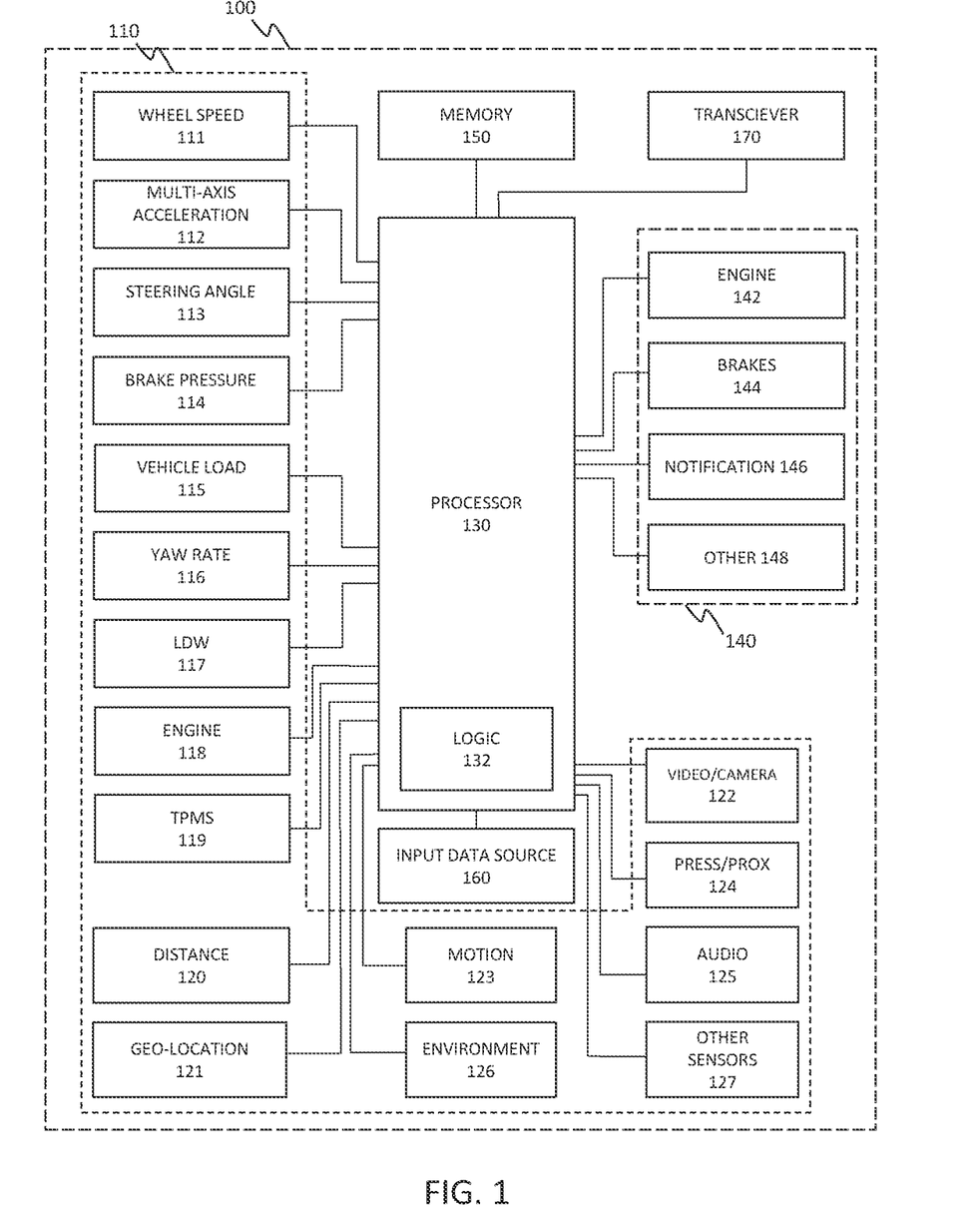
FIG. 1 is a block diagram of an exemplary system environment in which one form of a system may operate that is configured to detect an overloaded vehicle and/or detect a shift in a load within the vehicle.

FIG. 1 is a block diagram of an environment in which a vehicle overload/load shift event detection and reporting system 100 may operate. A vehicle overload/load shift event detection and reporting system 100 may be adapted to detect a variety of operational parameters and conditions of a vehicle and a driver's interaction therewith (i.e., event-based data, performance-based data, etc.) and, based thereon, to determine if a driving and/or vehicle event has occurred (e.g., if one or more operational parameter/condition thresholds has been exceeded). The data related to detected events (i.e., event-based data or data sets) may then be stored and/or transmitted to a remote location/device (e.g., backend server, dispatch center computer, mobile device, etc.), and one or more vehicle systems can be controlled based thereon.

The vehicle overload/load shift event detection and reporting system 100 may include one or more devices or systems 110 for providing vehicle and/or driver related data, including data indicative of one or more operating parameters or one or more conditions of a vehicle, its surroundings and/or its cabin occupants. The vehicle overload/load shift event detection and reporting system 100 may, alternatively or additionally, include a signal interface for receiving signals from the one or more devices or systems 110, which may be configured separate from system 100. For example, the devices 110 may be one or more sensors, such as but not limited to, one or more wheel speed sensors 111, one or more acceleration sensors such as multi-axis acceleration sensors or lateral movement acceleration sensors 112, a steering angle sensor 113, a brake pressure sensor 114, one or more vehicle load sensors such as axle pressure sensors positioned at axles of a trailer 115, a yaw rate sensor 116, a lane departure warning (LDW) sensor or system 117, one or more engine speed or condition sensors 118, and a tire pressure monitoring system (TPMS) 119. The vehicle overload/load shift event detection and reporting system 100 may also utilize additional devices or sensors, including for example a forward distance sensor and/or a rear distance sensor 120 (e.g., radar, lidar, etc.) and/or a geo-location sensor 121. Additional sensors for capturing driver related data may include one or more video sensors 122 and/or motion sensors 123, pressure or proximity sensors 124 located in one or more seats and/or driver controls (e.g., steering wheel, pedals, etc.), audio sensors 125, or other sensors configured to capture driver related data. The vehicle overload/load shift event detection and reporting system 100 may also utilize environmental sensors 126 for detecting circumstances related to the environment of the driving excursion, including for example, weather, road conditions, time of day, traffic conditions, etc. Other sensors 127, actuators and/or devices or combinations thereof may be used or otherwise provided as well, and one or more devices or sensors may be combined into a single unit as may be necessary and/or desired. For example, biometric sensors may be included for detecting biometric data of the vehicle occupants.

The vehicle overload/load shift event detection and reporting system 100 may also include a logic applying arrangement such as a controller or processor 130 and control logic 132, in communication with the one or more devices or systems. The processor 130 may include one or more inputs for receiving data from the devices or systems. The processor 130 may be adapted to process the data and compare the raw or processed data to one or more stored threshold values or desired averages or value ranges, or to process the data and compare the raw or processed data to one or more circumstance-dependent desired value, so as to detect one or more driver and/or vehicle related events.

The processor 130 may also include one or more outputs for delivering a control signal to one or more vehicle control systems 140 based on the detection of the event(s) and/or in response to vehicle and/or driver related data. The control signal may instruct the systems 140 to provide one or more types of driver assistance warnings (e.g., warnings relating to braking, obstacle avoidance, driver performance, passenger performance, etc.) and/or to intervene in the operation of the vehicle to initiate corrective action. For example, the processor 130 may generate and send the control signal to an engine electronic control unit 142 or an actuating device to reduce the engine throttle and slow the vehicle down. Further, the processor 130 may send the control signal to one or more vehicle brake systems 144 to selectively engage the brakes (e.g., a differential braking operation). A variety of corrective actions may be possible and multiple corrective actions may be initiated at the same time. It will be understood that such corrective actions need not be contemporaneous with detected events and/or event data, and may, additionally or alternatively, be responsive to one or more historical records of detected events and/or event data. The corrective actions may precede an anticipated driver behavior change or predicted event or change of circumstances.

The vehicle control components may further include brake light(s) and other notification devices 146, which may be configured to provide warnings and/or notifications externally to the vehicle surroundings and/or internally to the vehicle occupants. Example warnings and/or notifications include: headway time/safe following distance warnings, lane departure warnings, warnings relating to braking and or obstacle avoidance events, warnings related to driver performance, warnings related to passenger performance, and any other type of warning or notification in furtherance of the embodiments described herein. Other vehicle control systems 148 may also be controlled in response to detected events and/or event data.

The vehicle overload/load shift event detection and reporting system 100 may also include a memory portion 150 for storing and accessing system information, such as for example the system control logic 132. The memory portion 150, however, may be separate from the processor 130. The sensors 110, controls 140 and/or processor 130 may be part of a preexisting system or use components of a preexisting system.

The vehicle overload/load shift event detection and reporting system 100 may also include a source of vehicle-related input data 160, which may be indicative of a configuration/condition of the commercial vehicle and/or its environmental circumstances (e.g., road conditions, geographic area conditions, etc.). The processor 130 may sense or estimate the configuration/condition and/or environmental circumstances of the vehicle based on the input data, and may select a control tuning mode or sensitivity based on the vehicle configuration/condition and/or environmental circumstances. The processor 130 may compare the operational data received from the sensors 110 to the information provided by the tuning. Such tuning may be useful, for example, where a distracting passenger is present while driving a heavily loaded vehicle. Such input data may be further useful in evaluating driving performance, as described herein. For example, the driving performance of one or more driving team may be evaluated with respect to common environmental circumstances (e.g., performance in less desirable geographic areas).

In addition, the vehicle overload/load shift event detection and reporting system 100 may be operatively coupled with one or more imaging devices 122. The imaging devices 122 may include one or more driver facing cameras that are trained on the driver and/or trained on the interior of the cab of the commercial vehicle. However, it should be appreciated that the imaging devices 122 may be disposed on the vehicle such as, for example, a video camera on each corner of the vehicle, one or more cameras mounted remotely and in operative communication with the vehicle overload/load shift event detection and reporting system 100 to record images of the roadway ahead of the vehicle. Such cameras may, for instance, indicate undesirable proximity to objects, the roadway verge, etc.

In some implementations, driver related data can be collected directly using the driver facing camera, such driver related data including head position, eye gaze, hand position, postural attitude and location, or the like, within the vehicle. In addition, driver identity and/or presence can be determined based on facial recognition technology, body/posture template matching, and/or any other technology or methodology for making such determinations by analyzing video data.

In operation, the driver facing camera may capture video data of an interior of a vehicle cabin that includes a face of a driver. The video data may be captured on a continuous basis, or in response to a detected event. Such data may comprise a sequence of video frames with separate but associated sensor data that has been collected from one or more on-vehicle sensors or devices, as detailed herein.

The vehicle overload/load shift event detection and reporting system 100 may also include a transmitter/receiver (transceiver) module 170 such as, for example, a radio frequency (RF) transmitter including one or more antennas for wireless communication of data and control signals, including control requests, event-based data, performance-based data, vehicle configuration/condition data, or the like, between the vehicle and one or more remote locations/devices, such as, for example, backend servers, dispatch center computers, and mobile devices, having a corresponding receiver and antenna. The transmitter/receiver (transceiver) module 170 may include various functional parts of sub portions operatively coupled with a platoon control unit including for example a communication receiver portion, a global position sensor (GPS) receiver portion, and a communication transmitter. For communication of specific information and/or data, the communication receiver and transmitter portions may include one or more functional and/or operational communication interface portions as well.

The processor 130 may be operative to select and combine signals from the sensor systems into event-based data and/or performance-based data representative of higher-level vehicle and/or driver related data. For example, data from the multi-axis acceleration sensors 112 may be combined with the data from the steering angle sensor 113 to determine excessive curve speed event data. Other hybrid data relatable to the vehicle and/or driver and obtainable from combining one or more selected raw data items from the sensors includes, for example and without limitation, excessive braking event data, excessive curve speed event data, lane departure warning event data, excessive lane departure event data, lane change without turn signal event data, lane change without mirror usage data, loss of video tracking event data, LDW system disabled event data, distance alert event data, forward collision warning event data, haptic warning event data, collision mitigation braking event data, automatic traction control (ATC) event data, electronic stability control (ESC) event data, roll stability control (RSC) event data, anti-lock braking system (ABS) event data, tire pressure monitoring system (TPMS) event data, engine system event data, following distance event data, fuel consumption event data, adaptive cruise control (ACC) usage event data, and late speed adaptation (such as that given by signage or exiting). Still other hybrid data relatable to the vehicle and/or driver and obtainable from combining one or more selected raw data items from the sensors includes, for example and without limitation, driver out of position event data, passenger out of position event data, driver distracted event data, driver drowsy event data, driver hand(s) not on wheel event data, passenger detected event data, wrong driver event data, seatbelt not fastened event data, driver cellphone use event data, distracting passenger event data, mirror non-use event data, unsatisfactory equipment use event, driver smoking event data, passenger smoking event data, insufficient event response event data, insufficient forward attention event data. The aforementioned events are illustrative of the wide range of events that can be monitored for and detected by the vehicle overload/load shift event detection and reporting system 100, and should not be understood as limiting in any way.

The vehicle overload/load shift event detection and reporting system 100 may further include a bus or other communication mechanism for communicating information, coupled with the processor 130 for processing information. The system may also include a main memory 150, such as random access memory (RAM) or other dynamic storage device for storing instructions and/or loaded portions of a trained neural network to be executed by the processor 130, as well as a read only memory (ROM) or other static storage device for storing other static information and instructions for the processor 130. Other storage devices may also suitably be provided for storing information and instructions as necessary or desired.

In at least some implementations, the vehicle overload/load shift event detection and reporting system 100 of FIG. 1 is configured to execute one or more software systems or modules that perform or otherwise cause the performance of one or more features and aspects described herein. Computer executable instructions may therefore be read into the main memory 150 from another computer-readable medium, such as another storage device, or via the transceiver 170. Execution of the instructions contained in main memory 150 may cause the processor 130 to perform one or more of the process steps described herein. In some implementations, hard-wired circuitry may be used in place of or in combination with software instructions to implement the invention. Thus, implementations of the example embodiments are not limited to any specific combination of hardware circuitry and software.

Methods for detecting a vehicle overload, such as those described below, may be performed within the system environment described above in conjunction with FIG. 1. It will be appreciated that the method described below may be utilized in vehicles where the load is positioned in the vehicle or in vehicle configurations where a load is positioned in a trailer of the vehicle.

As will be described in conjunction with FIG. 2, in some implementations of a vehicle overload/load shift event detection and reporting system, one or more processor of the system receives data such as a calculated gross mass of a vehicle data that was generated by systems such as a vehicle braking system. The one or more processors determines a gross mass estimate of the vehicle based on the received data and compares the determined gross mass estimate to an overweight value. When the one or more processors of the system determines that the vehicle is overweight based on the comparison, the one or more processors may perform operations such notifying a driver of the vehicle of the overweight determination, notifying a fleet management system associated with the vehicle of the overweight determination, and/or modifying one or more vehicle operations based on the vehicle overweight determination.

Figure 2:
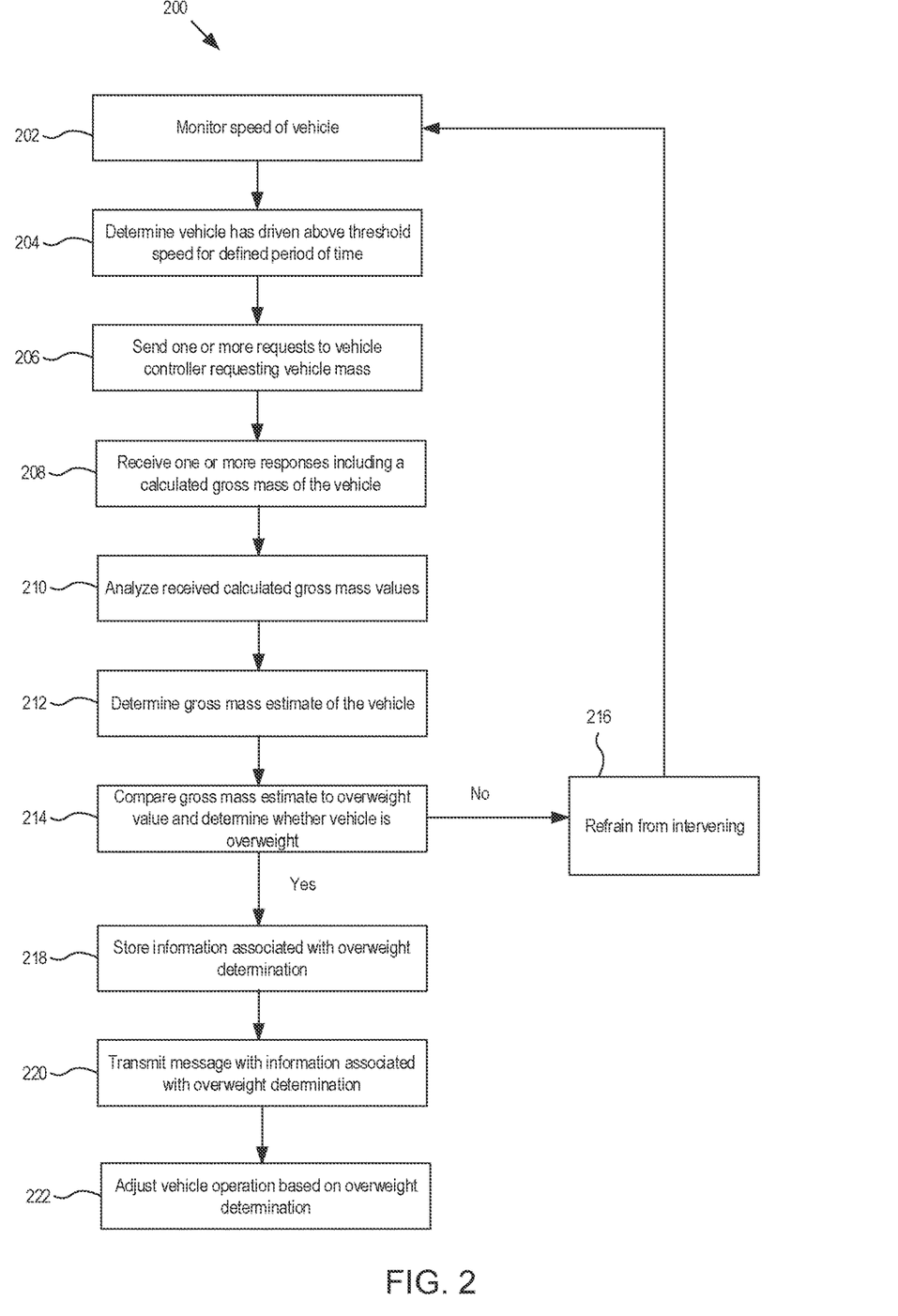
FIG. 2 is a flow chart of one form of a method for detecting an overloaded vehicle.

FIG. 2 is a flow chart 200 of one form of a method for detecting an overloaded vehicle.

At step 202, at least one processor of a vehicle overload/load shift event detection and reporting system positioned in a vehicle, such as those described above in conjunction with FIG. 1, monitors a speed of the vehicle. In some implementations, the at least one processor monitors the speed of the vehicle through information received from systems such as wheel speed sensors. However, in other implementations, the at least one processor may utilize global positioning system (GPS) data, environmental sensing data such as a radar, cameras, or LiDar, or any other type of data that is able to accurately provide a speed of a vehicle.

In some implementations, the vehicle overload/load shifting event detection and reporting system waits to start operations for determining whether the vehicle is overloaded until the at least one processor has detected that the vehicle has traveled above a threshold speed for at least a defined period of time. By waiting until the vehicle has traveled above the threshold speed for at least the defined period of time, systems of the vehicle such as braking systems have time to generate more reliable calculated gross mass values, when requested below.

However, in other implementations, the vehicle overload/load shifting event detection and report system may immediately begin operations for determine whether the vehicle is overload.

In implementations where there the at least one processor monitors the speed of the vehicle, at step 204, the at least one processor determines that the vehicle has traveled above a threshold speed for at least a defined period of time. In one illustrative example, the at least one processor may determine that the vehicle traveled has traveled at least 35 miles per hour for at least 30 minutes. However, other thresholds may be used.

At step 206, the at least one processor sends one or more requests to a controller of the vehicle, such as a brake controller, that requests a vehicle mass. In some implementations, the at least one processor only sends a single request for a vehicle mass to the controller of the vehicle. However, in other implementations, the at least one processor sends a plurality of requests for a vehicle mass, where the requests are sent periodically over time.

It will be appreciated that in some implementations, a controller of a vehicle such as a brake controller may calculate a gross mass of the vehicle based on at least an amount of force that an engine of the vehicle generates during operation of the vehicle and wheel speeds of two or more wheels of the vehicle.

At step 208, the at least one processor receives one or more responses from the controller, where each response includes a calculated gross mass of the vehicle.

In some implementations where a single request is sent to the controller at step 206, a single response is received. In other implementations where a plurality of requests is sent to the controller over time at step 206, a plurality of responses is also received over time where the controller returns a calculated gross mass of the vehicle at the time of the request.

At step 210, the at least one processor analyzes the calculated gross mass of the vehicle received in the responses from the controller, and at step 212, the at least one processor determines a gross mass estimate of the vehicle.

In some implementations where a single response is received, the at least one processor may utilize the calculated gross mass of the vehicle from the controller to be the gross mass estimate of the vehicle.

In other implementations where a plurality of responses is received, the at least one processor may analyze the plurality of responses to identify calculated gross masses of at least three consecutive responses of the plurality of responses whose value are within a defined range of each other. In one illustrative example, the at least one processor may analyze the plurality of responses to identify values that are within 10% of each other. However, it will be appreciated that other defined ranges can be used.

In some implementations, the at least one processor may refrain from analyzing responses from the plurality of responses that are received from the controller within a defined period of time from a power cycle of the vehicle. This is done to allow vehicle systems such as braking systems sufficient time to generate more reliable calculated gross mass values.

The at least one processor utilizes the responses whose calculated gross masses are within the defined range to determine a gross mass estimate of the vehicle. In some implementations, the at least one processor calculates the gross mass estimate of the vehicle as an average of the responses whose calculated gross masses are within the defined range of each other. However, other statistical values based on the calculated gross masses of the responses can be used.

At step 214, the at least one processor compares the gross mass estimate of the vehicle determined at step 212 to an overweight value associated with the vehicle to determine whether the vehicle is overweight. The at least one processor may obtain the overweight value associated with the vehicle from memory within the vehicle overload/load shifting event detection and reporting system of the vehicle that may have been stored by a driver or a fleet control system; from other systems within the vehicle; or from sources external to the vehicle such as fleet system databases, Department of Transportation (DOT) databases, roadside inspection sources, transportation infrastructure databases, original equipment manufacturer (OEM) databases, component supplier database, other vehicles, or any other available source that may provide information such as an overweight value associated with a vehicle.

When the comparison does not indicate that the vehicle is overweight, at step 216, the at least one processor does not intervene in the operation of the vehicle and the above-recited steps are repeated during operation of the vehicle. In some implementations, the at least one processor of the vehicle overload/load shifting event detection and reporting system will continue to operate and monitor for a vehicle overload while the vehicle is in operation and re-initialize after a period of low speeds or stopping.

Alternatively, when the comparison does indicate that the vehicle is overweight, at step 218, the at least one processor may perform operations such as storing information associated with the overweight determination in the memory. For example, the at least one processor may store a vehicle identification number (VIN) of the vehicle, a location of the vehicle when the overweight determination occurs, the gross mass estimate of the vehicle determined at step 212, or any other information that may be useful in evaluating the overweight determination.

Additionally, at step 220, the at least one processor may perform operations such as transmitting a message with information associated with the overweight determination to a fleet control system associated with the vehicle, display a warning associated with the overweight determination to a driver, and/or play an audible warning associated with the overweight determination the driver. For example, the at least one processor may display an alert on at least one of a vehicle display or a mobile device of the driver, and may emit an alert from at least one of a vehicle audio system or the mobile device of the driver.

In some implementations, at step 222, the processor may additionally adjust at least one vehicle operation or driver assistance system of the vehicle based on the determination that the vehicle is overweight. For example, the at least one processor may adjust an amount of time before a braking action that vehicle systems alert the driver to an upcoming braking action and/or the processor may increase a distance before initiation of a braking action that vehicle systems alert a driver to an upcoming braking action.

With respect to operations of the vehicle, the processor may also perform operations such as adjusting a braking performance of the vehicle or adjusting a stability performance of the vehicle. For example, the processor may adjust braking performance to begin braking earlier or more positively. Braking may be set to start once the driver has removed their foot from the gas pedal and an object is detected ahead at close range. That is, braking is anticipated and started earlier than in normal operation with a usual 'driver must actively start to brake' scenario. In some circumstances, the at least one processor may further perform actions such as engaging autonomous control of the vehicle, or once stopped in a safe location, prohibiting the driver from further operating the vehicle.

In addition to detecting when a vehicle is overweight, as described above, the vehicle overload/load shift event detection and reporting system may detect when a load within a vehicle shifts. It will be appreciated that the method described below may be utilized in vehicles where the load is positioned in the vehicle or in vehicle configurations where the load is positioned in a trailer of the vehicle.

Methods for detecting a shift of a load of within a vehicle, such as those described below, may be performed within the system environment described above in conjunction with FIG. 1. As will be described in conjunction with FIG. 3, in some implementations of a vehicle overload/load shift event detection and reporting system, one or more processors of the system receive lateral movement information from sensors positioned at a trailer of the vehicle during turns of the vehicle. When two similar turns are identified, such as a similar left-hand turn and a right-hand turn, the one or more processors determine whether the lateral movement information associated with the two turns is substantially similar. When a difference in the lateral movement data between the left-hand turn and the right-hand turn indicate that a load in the trailer of the vehicle has shifted, the system may perform operations such notifying a driver of the vehicle of the load shift determination, notifying a fleet management system associated with the vehicle of the load shift determination, and/or modifying one or more vehicle operations based on the load shift determination.

Figure 3:
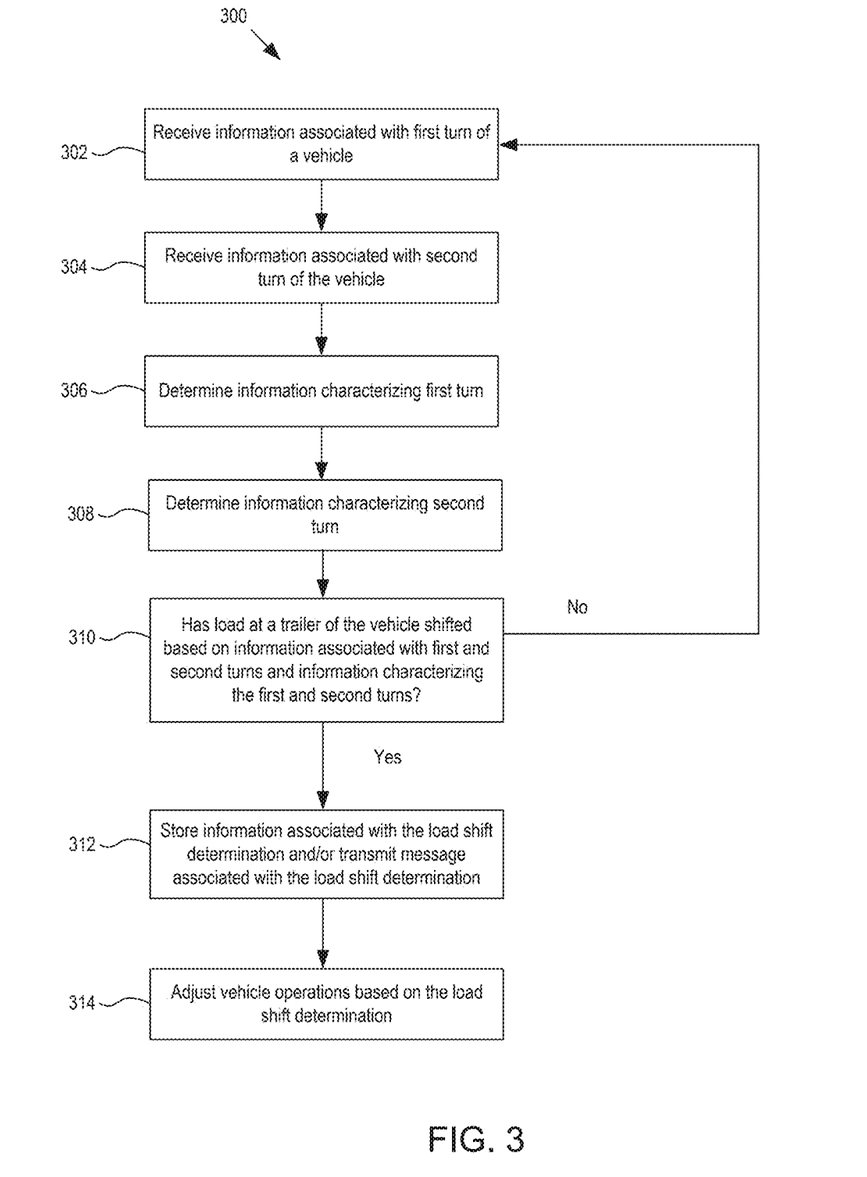
FIG. 3 is flow chart of one form of a method for detecting a shift in a load within a vehicle.

FIG. 3 is flow chart 300 of one form of a method for detecting a shift in a load of a vehicle.

At step 302, at least one processor of a vehicle overload/load shift event detection and reporting system positioned in a vehicle, such as those described above in conjunction with FIG. 1, receives information associated with a first turn of the vehicle from a trailer of the vehicle, and step 304, the at least one processor receives information associated with a second turn from the trailer. In some implementations, the first and second turns may be turns in different directions such that one of the first turn or the second turn is predominately a left-hand turn and the other of the first turn or the second turn is predominately a right-hand turn.

In some implementations, the information associated with the first turn and the information associated with the second turn includes lateral movement information at the trailer received from at least one lateral accelerometer positioned at the trailer. The lateral movement information represents lateral movements at the trailer during the turn.

In some implementations, the information associated with the first turn and the information associated with the second turn may further include vehicle speed while the vehicle is making the turn as determined by the vehicle and/or trailer; vehicle steering information received from steering sensors of the vehicle such as how quickly a driver turns a steering wheel, a degree to which a driver turns the steering wheel, or a steering angle in terms of angular velocity (deg/sec); vehicle accelerations during a turn as determined by the vehicle and/or trailer; wheel speeds during a turn as determined by the vehicle and/or trailer; air bag load information as measured at the trailer; yaw rate information received from yaw rate sensors of the vehicle and/or the trailer; and/or axle pressure information received from pressure sensors positioned at axles of the trailer.

At step 306, the at least one processor determines data characterizing the first turn, and at step 308, the at least one processor determines data characterizing the second turn. In some implementations, the data characterizing the turn may include information such as a length of a turn, a duration of a turn, a radius of curvature of a turn, a degree of curvature of a turn, an incline of a turn, or any other type of information that may characterize a turn that may be useful in comparing different measurements at a tractor during two different turns, as described below.

In some implementations, the at least one processor may determine the data characterizing the turn by obtaining global positioning system (GPS) data during the turn and accessing previously-recorded turn data corresponding to the GPS coordinates. In other implementations, the at least one processor may determine data characterizing a turn by monitoring data generated by the vehicle and/or the tractor during the turn. For example, as noted above, the vehicle may monitor and record a length of a turn, a duration of a turn, a radius of curvature of a turn, a degree of curvature of a turn, an incline of a turn, or any other type of information that may characterize a turn that may be useful in comparing different measurement at a tractor during two different turns.

At step 310, the at least one processor determines whether a load of the trailer has shifted based on the information associated with the first and second turn received at steps 302 and 304 and the data characterizing the first and second turn determined at steps 306 and 308.

Generally, when comparing information associated with lateral movement of a trailer between similar turns in a left-hand direction and a right-hand direction, the lateral movements of the trailer should be substantially the same. Accordingly, when the first and second turns are similar turns in a left-hand direction and a right-hand direction, the at least one processor compares lateral movement information associated with the first turn with lateral movement information associated with the second turn to determine whether they are substantially the same. In some implementations, the lateral movements associated with the first turn are determined to be substantially the same as the lateral movements associated with the second turn when the values are within 25% of each other. However, any value can be used that identifies for a trailer when a shift in a load of the trailer has likely occurred or not occurred.

When the at least one processor determines that the lateral movements are substantially the same, the at least one processor determines that the load of the trailer has not shifted. However, when the at least one processor determines that the lateral movements are not substantially the same, the at least one processor determine that the load of the trailer has shifted.

In some implementations, the at least one processor determines that the first and second turns in a left-hand direction and a right-hand direction are substantially similar when the data characterizing the first turn and the data characterizing the second turn indicate that a lateral force on the trailer resulting from the characteristics of the first turn and the vehicle operations during the first turn are substantially similar to the lateral force on the trailer resulting from the characteristics of the second turn and the vehicle operations during the second turn.

In some implementations, in addition to lateral movement information and data characterizing the turns, the at least one processor may utilize information such as steering information associated with the first turn and steering information associated with the second turn. The at least one processor utilizes steering information associated with the turns to determine whether the actions of the driver to control the vehicle during the first turn are similar to the actions of the driver to control the vehicle during the second turn.

In yet further implementations, in addition to lateral movement information and data characterizing the turns, the at least one processor may utilize information such as yaw rate information associated with the first turn and yaw rate information associated with the second turn. The at least one processor utilizes yaw rate information associated with the turns to determine a degree to which the trailer may lean during a turn and examine whether the degree to which the trailer leans during the first turn is similar to the degree to which the trailer leans during the second turn.

In further implementations, in addition to lateral movement information and data characterizing the turns, the at least one processor may utilize information such as axle pressure information associated with the first turn and axle pressure information associated with the second turn. The at least one processor utilizes axle pressure information associated with the turns to determine if a weight at the axle is changing between turns.

When the at least one processor determines at step 310 that the load of the trailer has not shifted, the above-identified steps are repeated during operation of the vehicle and the at least one processor continues to monitor for a shifting of the load of the trailer.

Alternatively, when the at least one processor determines at step 310 that the load of the trailer has shifted, at step 312 the at least one processor performs one or more operations such as storing information associated with the determination that the load of the trailer has shifted in the memory, transmitting a message with information associated with the determination that the load of the trailer has shifted to a fleet control system associated with the vehicle, display a warning associated with the load shift determination to a driver, and/or play an audible warning associated with the load shift determination the driver. For example, the at least one processor may display an alert on at least one of a vehicle display or a mobile device of the driver, and may emit an alert from at least one of a vehicle audio system or the mobile device In some implementations, at step 314, the at least one processor may additionally adjust at least one vehicle operation or driver assistance system of the vehicle based on the determination that the load of the trailer has shifted. For example, the at least one processor may adjust an amount of time before a braking action that vehicle systems alert the driver to an upcoming braking action and/or the processor may increase a distance before initiation of a braking action that vehicle systems alert a driver to an upcoming braking action.

With respect to operations of the vehicle, the processor may also perform operations such as adjusting a braking performance of the vehicle or adjusting a stability performance of the vehicle. For example, the processor may adjust braking performance to begin braking earlier or more positively. Braking may be set to start once the driver has removed their foot from the gas pedal and an object is detected ahead at close range. That is, braking is anticipated and started earlier than in normal operation with a usual 'driver must actively start to brake' scenario. In some circumstances, the at least one processor may further perform actions such as engaging autonomous control of the vehicle, or once stopped in a safe location, prohibiting the driver from further operating the vehicle.

FIGS. 1-3 and their accompanying description describe implementations of systems and methods for detecting when a vehicle is overloaded and/or when a load of a vehicle has shifted. By detecting issues such as these during operation a vehicle, a driver, a fleet control system, and/or the vehicle itself may modify operations of the vehicle in order to decreases the chances of vehicle accidents in the short term and extend the service life of the vehicle and/or prevent increased operating expenses in the long term.

Those having ordinary skill in the art may be able to make alterations and modifications to what is described herein without departing from its spirit and scope. The present disclosure is to be considered as an exemplification of the principles of the present disclosure, and is not intended to limit the broad aspects of the present disclosure to any embodiment or implementations described herein.

In accordance with the practices of persons skilled in the art, aspects of embodiments and implementations of the present disclosure may be described with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, code segments perform certain tasks described herein. The code segments can be stored in a processor readable medium. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

In the detailed description and corresponding figures, numerous specific details are set forth in order to provide a thorough understanding of the present disclosure. However, it should be appreciated that the disclosure may be practiced without such specific details. Additionally, well-known methods, procedures, components, and circuits have not been described in detail.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner on one or more embodiments without limitation.

The term "server" means a functionally-related group of electrical components, such as a computer system that may or may not be connected to a network and which may include both hardware and software components, or alternatively only the software components that, when executed, carry out certain functions. The "server" may be further integrated with a database management system and one or more associated databases.

In accordance with the descriptions herein, the term "computer readable medium," as used herein, refers to any non-transitory media that participates in providing instructions to the processor for execution. Such a non-transitory medium may take many forms, including but not limited to volatile and non-volatile media. Non-volatile media includes, for example, optical or magnetic disks. Volatile media includes dynamic memory for example and does not include transitory signals, carrier waves, or the like.

In addition, and further in accordance with the descriptions herein, the term "logic," as used herein, particularly with respect to FIG. 1, includes hardware, firmware, software in execution on a machine, and/or combinations of each to perform a function(s) or an action(s), and/or to cause a function or action from another logic, method, and/or system. Logic may include a software-controlled microprocessor, a discrete logic (e.g., ASIC), an analog circuit, a digital circuit, a programmed logic device, a memory device containing instructions, and so on. Logic may include one or more gates, combinations of gates, or other circuit components.

The embodiments and implementations described in detail above are considered novel over the prior art and are considered critical to the operation of at least one aspect of the described systems, methods and/or apparatuses, and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements.

Changes from the subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

Furthermore, the functionalities described herein may be implemented via hardware, software, firmware or any combination thereof, unless expressly indicated otherwise. If implemented in software, the functionalities may be stored in a memory as one or more instructions on a computer readable medium, including any available media accessible by a computer that can be used to store desired program code in the form of instructions, data structures or the like. Thus, certain aspects may comprise a computer program product for performing the operations presented herein, such computer program product comprising a computer readable medium having instructions stored thereon, the instructions being executable by one or more processors to perform the operations described herein. It will be appreciated that software or instructions may also be transmitted over a transmission medium as is known in the art. Further, modules and/or other appropriate means for performing the operations described herein may be utilized in implementing the functionalities described herein.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. A system comprising:
a memory; and
at least one processor configured to execute instructions stored in the memory and to:
receive lateral movement information associated with a first turn from at least one lateral accelerometer of a trailer of a vehicle;
determine data characterizing the first turn based on global positioning system (GPS) data of the vehicle during the first turn, where the data characterizing the first turn comprises a degree of curvature of the first turn and a degree of incline of the first turn;
receive lateral movement information associated with a second turn from the at least one lateral accelerometer of the trailer, wherein one of the first turn or the second turn is a left-hand turn, and the other of the first turn or the second turn is a right-hand turn;
determine data charactering the second turn based on GPS data of the vehicle during the second turn, where the data characterizing the second turn comprises a degree of curvature of the second turn and a degree of incline of the second turn;
determine whether a load of the trailer has shifted based on a comparison of the lateral movement information associated with the first turn and the lateral movement information associated with the second turn and based on the data characterizing the first turn and the data characterizing the second turn; and
upon a determination that the load of the trailer has shifted:
at least one of store information associated with the determination that the load of the trailer has shifted in the memory or transmit a message with information associated with the determination that the load of the trailer has shifted; and
automatically adjust at least one of a vehicle operation or a driver assistance system of the vehicle based on the determination that the load of the trailer has shifted.

2. The system of claim 1, wherein the at least one processor is further configured to:

receive steering information associated with the first turn from the vehicle; and
receive steering information associated with the second turn from the vehicle;
wherein the at least one processor is configured to determine whether the load of the trailer has shifted additionally based on the steering information associated with the first turn and the steering information associated with the second turn.

3. The system of claim 1, wherein the processor is further configured to:
receive yaw rate information associated with the first turn from at least one yaw rate sensor of the trailer; and
receive yaw rate information associated with the second turn from the at least one yaw rate sensor of the trailer;
wherein the at least one processor is configured to determine whether the load of the trailer has shifted additionally based on the yaw rate information associated with the first turn and the yaw rate information associated with the second turn.

4. The system of claim 1, wherein the processor is further configured to:
receive axle pressure information associated with the first turn from at least one pressure sensor positioned on an axle of the trailer; and
receive axle pressure information associated with the second turn from the at least one pressure sensor positioned on the axle of the trailer;
wherein the at least one processor is configured to determine whether the load of the trailer has shifted additionally based on the axle pressure information associated with the first turn and the axle pressure information associated with the second turn.

5. The system of claim 1, wherein the at least one processor is configured to transmit the message with information associated with the determination that the load of the trailer has shifted to a display of the vehicle.

6. The system of claim 1, wherein the at least one processor is configured to transmit the message with information associated with the determination that the load of the trailer has shifted to a fleet control system associated with the vehicle.

7. The system of claim 1, wherein to automatically adjust at least one of a vehicle operation or a driver assistance system of the vehicle based on the determination that the load of the trailer has shifted, the at least one processor is configured to:
adjust an amount of time before a braking action that vehicle systems alert a driver to an upcoming braking action.

8. The system of claim 1, wherein to automatically adjust at least one of a vehicle operation or a driver assistance system of the vehicle based on the determination that the load of the trailer has shifted, the at least one processor is configured to:
increase a distance before initiation of a braking action that vehicle systems alert a driver to an upcoming braking action.

9. A method comprising:
receiving, with at least one processor, lateral movement information associated with a first turn from at least one lateral accelerometer of a trailer of a vehicle;
determining, with the at least one processor, data characterizing the first turn based on global positioning system (GPS) data of the vehicle during the first turn, where the data characterizing the first turn comprises a degree of curvature of the first turn and a degree of incline of the first turn;
receiving, with the at least one processor, lateral movement information associated with a second turn from the at least one lateral accelerometer of the trailer, wherein one of the first turn or the second turn is a left-hand turn, and the other of the first turn or the second turn is a right-hand turn;
determining, with the at least one processor, data characterizing the second turn based on GPS data of the vehicle during the second turn, where the data characterizing the second turn comprises a degree of curvature of the second turn and a degree of incline of the second turn;
determining, with the at least one processor, whether a load of the trailer has shifted based on a comparison of the lateral movement information associated with the first turn and the lateral movement information associated with the second turn and based on the data characterizing the first turn and the data characterizing the second turn; and
upon a determination that the load of the trailer has shifted:
at least one of storing, with the at least one processor, information associated with the determination that the load of the trailer has shifted in a memory or transmitting, with the at least one processor, a message with information associated with the determination that the load of the trailer has shifted; and
automatically adjusting, with the at least one processor, at least one of a vehicle operation or a driver assistance system of the vehicle based on the determination that the load of the trailer has shifted.

10. The method of claim 9, further comprising:
receiving, with the at least one processor, steering information associated with the first turn from the vehicle; and
receiving, with the at least one processor, steering information associated with the second turn from the vehicle;
wherein the at least one processor determines whether the load of the trailer has shifted additionally based on the steering information associated with the first turn and the steering information associated with the second turn.

11. The method of claim 9, further comprising:
receiving, with the at least one processor, yaw rate information associated with the first turn from at least one yaw rate sensor of the trailer; and
receiving, with the at least one processor, yaw rate information associated with the second turn from the at least one yaw rate sensor of the trailer;
wherein the at least one processor determines whether the load of the trailer has shifted additionally based on the yaw rate information associated with the first turn and the yaw rate information associated with the second turn.

12. The method of claim 9, wherein further comprising:
receiving, with the at least one processor, axle pressure information associated with the first turn from at least one pressure sensor positioned on an axle of the trailer; and
receiving, with the at least one processor, axle pressure information associated with the second turn from the at least one pressure sensor positioned on the axle of the trailer;

wherein the at least one processor determines whether the load of the trailer has shifted additionally based on the axle pressure information associated with the first turn and the axle pressure information associated with the second turn.

13. The method of claim 9, wherein the at least one processor transmits the message with information associated with the determination that the load of the trailer has shifted to a display of the vehicle.

14. The method of claim 9, wherein the at least one processor transmits the message with information associated with the determination that the load of the trailer has shifted to a fleet control system associated with the vehicle.

15. The method of claim 9, wherein automatically adjusting, with the at least one processor, at least one of a vehicle operation or a driver assistance system of the vehicle based on the determination that the load of the trailer has shifted comprises:
   adjusting, with the at least one processor, an amount of time before a braking action that vehicle systems alert a driver to an upcoming braking action.

16. The method of claim 9, wherein automatically adjusting, with the at least one processor, at least one of a vehicle operation or a driver assistance system of the vehicle based on the determination that the load of the trailer has shifted comprises:
   increasing, with the at least one processor, a distance before initiation of a braking action that vehicle systems alert a driver to an upcoming braking action.

* * * * *